United States Patent
Ziff et al.

(10) Patent No.: US 6,557,013 B1
(45) Date of Patent: Apr. 29, 2003

(54) STORY WORKFLOW MANAGEMENT SYSTEM AND METHOD

(75) Inventors: Susan Janette Ziff, Washington, DC (US); Allan L. Davidson, Nassau (BS)

(73) Assignee: Successes.com, inc., Washington, DC (US)

( * ) Notice: Subject to any disclaimer, the term of this patent is extended or adjusted under 35 U.S.C. 154(b) by 0 days.

(21) Appl. No.: 09/526,700

(22) Filed: Mar. 15, 2000

Related U.S. Application Data

(60) Provisional application No. 60/125,982, filed on Mar. 24, 1999.

(51) Int. Cl.[7] .............................................. G06F 17/30
(52) U.S. Cl. ..................................................... 707/205
(58) Field of Search ................. 707/201, 205; 345/733, 751; 700/90; 703/1; 705/4, 26, 30; 709/203, 242

(56) References Cited

U.S. PATENT DOCUMENTS 5,706,452 A * 1/1998 Ivanov ....................... 345/751
6,108,711 A * 8/2000 Beck et al. ................. 709/224

FOREIGN PATENT DOCUMENTS

| WO | WO 94/08310 | 4/1994 |
| WO | WO 98/01807 | 1/1998 |
| WO | WO 99/66425 | 12/1999 |

\* cited by examiner

*Primary Examiner*—Diane D. Mizrahi
*Assistant Examiner*—Apu M Mofiz
(74) *Attorney, Agent, or Firm*—Gray Cary Ware & Freidenrich LLP

(57) ABSTRACT

A system and method for story creation workflow management is provided which increases the speed, quality control and accuracy and reduces the cost of the story creation process by providing the steps of the story creation process in a single integrated system. The system also permits the users of the system to work at different times of the day and in different geographic locations. The system also permits the users of the system to rapidly determine the current status of any story in the system.

8 Claims, 24 Drawing Sheets

If you know of a success that you think would make a great story... tell us about it by filling in as many fields beside us you can.

→ 50

HOW CAN WE CONTACT YOU?

| | |
|---|---|
| your first name | your last name |
| title | your company |
| your email address | your phone number country prefix | street address

| | |
|---|---|
| city | state |
| zip | country |

WHOM SHOULD BE CONTACT FOR DETAILS, IF NOT YOU?

| | |
|---|---|
| your first name | your last name |
| title | your company |
| your email address | your phone number country prefix | street address

| | |
|---|---|
| city | state |
| zip | country |

IS THERE ANYBODY ELSE WHO NEEDS TO GIVE PERMISSION BEFORE WE PUBLISH THIS STORY?

contact information

FIGURE 2A

TELL US YOUR STORY, WHAT MAKES IT SO
SPECIAL AND WHY WAS IT SO SUCCESSFUL?

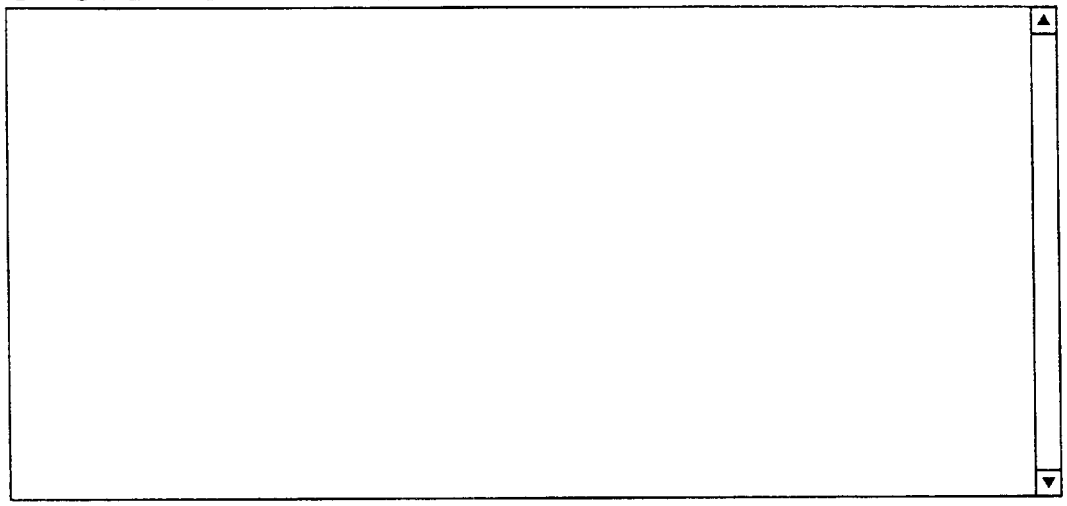

take as much room as you like for your story, field will adjust

IS THERE A WEBSITE THAT WE CAN LEARN MORE FROM?

URL

WHAT INDUSTRY ARE YOU IN?

Select one

HOW BIG IS THE COMPANY?

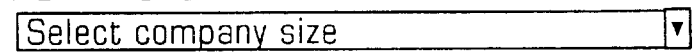
Select company size

PLEASE TELL US ABOUT THE MAIN HARDWARE AND
SOFTWARE USED ON THIS PROJECT

HARDWARE                              SOFTWARE

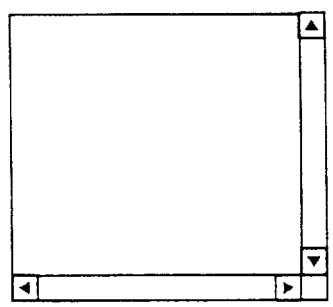                  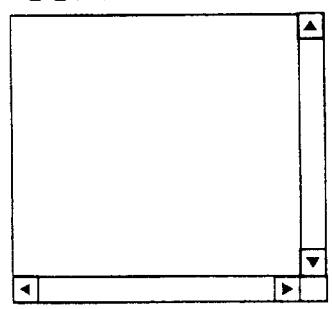

use one line for each item            use one line for each item

FIGURE 2B

HOW DID THIS PRODUCT HELP YOU SUCCEED? (HIGHER SALES, RELIABILITY...)
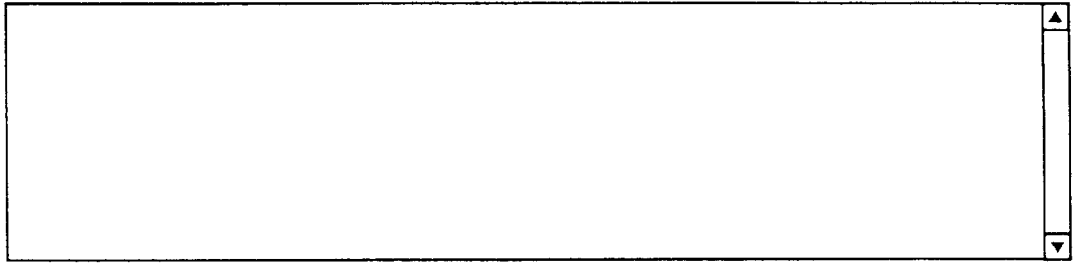
take as much space as you need
ANY ADDITIONAL INFORMATION OR WEBSITES WE SHOULD VISIT?
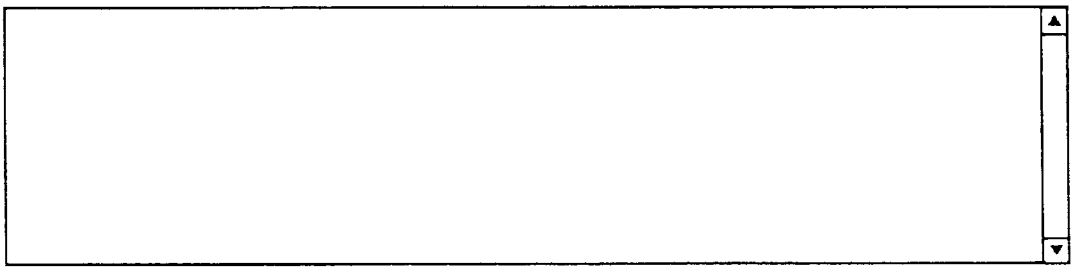
take as much space as you need
HOW DID YOU HEAR ABOUT THIS PROJECT?
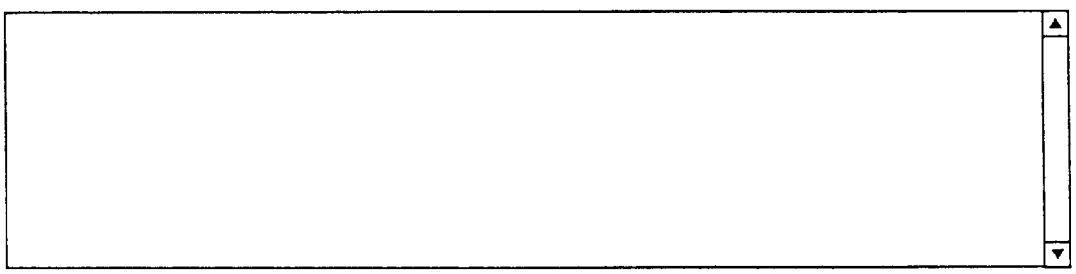
take as much space as you need
Submit this Success Story
Copyright 1998 The Cybercasters (America) Corp
All Rights Reserved
FIGURE 2C

52

Corporation

Publicity, Advertising and Promotional Release

The Quantum Corporation ("Quantum") appreciates and values the opportunity to serve the business needs of you and your company (the "Customer"). The positive experiences customers like you have had using Quantum's products affords us an unique opportunity to promote our products and your company.

In consideration for the potential promotional benefits Customer may receive from such exposure, Customer hereby grants to Quantum, or anyone authorized by Quantum, the right to utilize in any and all manner and media now known or later devised, including without limitation web-based and print media, throughout the world in perpetuity, solely for the purposes of publicity, promotion, and advertising, all materials, including without limitation all printed materials, photographs, illustrations, animated depiction of software program(s), screen shots, and oral reports or interviews provided by Customer to Quantum for such purposes in general and more specifically in relation to the success story known as:

_____    _____
(Ref. #)                     (Name of Success Story), (the" Materials").

Customer also grants to Quantum permission to use the Customer's Marks in any and all manner and media now known or later devised throughout the world in perpetuity, solely for publicity, promotion and advertising purposes. Customer's Marks shall mean Customer's company name, trademarks, logos, service names, software icon representations, and slogans as adopted by Customer from time to time and provided to Quantum as part of the Materials. Quantum shall use the Customer's Marks in accordance with Customer's policies on such use, as communicated in writing to Quantum from time to time.

If any of the Materials contain the name, likeness or picture, (including without limitation, photographs, film, video, or digital images), voice, quotations or testimonials, or biographical materials, of any of the Customer's officers, employees, agents, customers, or any other third party, customer represents and warrants that (i) Customer has sufficient rights to the materials to grant to Quantum the rights set forth in this release, and Quantum's exercise of such rights will not constitute an infringement of any intellectual property rights of any third party, and (ii) Customer has the full power to enter into this agreement, to carry out its obligations hereunder, and to grant the permissions granted to Quantum herein.

Customer expressly releases Quantum, its agents employees, licensees and assigns from and against any and all claims which Customer has or may have for invasion of privacy, defamation or any other cause of action arising out of production, distribution, broadcast or exhibition of the materials. Customer acknowledges that Quantum is under no obligation to exercise any of the rights granted hereunder.

The signature below acknowledges agreement with the grants and provisions in this document.

Signature: _____    Date: _____

Name/Title: _____

Company: _____

Address: _____

_____

_____

This document is also available as a pdf file which can be viewed using Adobe Acrobat Reader 2.1 or higher

| Serial# | Name | Tickler Date | Status Bar Pages Completed | | | | |
|---|---|---|---|---|---|---|---|
| 10146 | Janet Lee - Ingram Micro (QUANTUM) | | | | | | |
| 10147 | KidzOnline (QUANTUM) | | 1 | 2 | 3 | | 5 |
| 10148 | Arrow Electronics (QUANTUM) | | | | | | |
| 10253 | Greyound (QUANTUM) | | 1 | 2 | 3 | 4 | 5 |
| 10254 | Internet Archive (QUANTUM) | | 1 | 2 | 3 | 4 | 5 |
| 10256 | Origin Systems (QUANTUM) | | 1 | 2 | 3 | 4 | 5 |
| 10257 | MeritCare (QUANTUM) | | 1 | 2 | 3 | 4 | |
| 10258 | Bruce Toback's Durable Drives (QUANTUM) | | | 2 | 3 | | |
| 10260 | Micro Technology Groupe (QUANTUM) | | | | | | |
| 10261 | Peripheral Parts Support (QUANTUM) | | | | | | |
| 10262 | Alan M. Gordon Consulting (QUANTUM) | | | | | | |
| 10263 | BCD Computers (QUANTUM) | | 1 | 2 | 3 | | |
| 10264 | Elta Electronics (QUANTUM) | | 1 | | | | |
| 10268 | Cabelas (QUANTUM) | | | | | | |
| 10270 | Linkow Computing (QUANTUM) | | | | | | |
| 10271 | ELTA Electronics (QUANTUM) | | | | 3 | | |
| 10272 | Peter Plantec's Old Time Radio (QUANTUM) | | 1 | 2 | 3 | | |
| 10275 | Hewlett-Packard (QUANTUM) | | | 2 | | | |
| 10276 | Silicon Graphics (QUANTUM) | | | | | | |
| 10277 | A. D. Microcircuit Computer (QUANTUM) | | | | | | |
| 10278 | Digital Basics (QUANTUM) | | 1 | 2 | 3 | 4 | |
| 10279 | Aps Technologies (QUANTUM) | | | | | | |
| 10280 | Sound *Bytes (QUANTUM) | | 1 | 2 | 3 | 4 | |

Full Data of Current Story

Editor:

Initial OK:
- ☑ Requested (1.3)
- ☑ Authorized (1.4)

Copy Edit:
- ☑ Requested (4.6)
- ☑ Spell Checked (5.1.1)
- ☑ Format Checked (5.1.2)

WebReady
- ☑ Authorized (5.2)
- ☐ Spiked (1.5)

Writer:

Data Complete:

Releases:
- ☑ Verbal (2.1.3)
- ☑ Emailed (2.3)
- ☑ Fax (3.1)
- ☑ Original (4.1)

- ☑ Story data (2.1.4)
- ☑ Quotes (2.1.5)
- ☑ Web Cont. (2.1.6)
- ☑ Pix (4.2.1)
- ☑ Audio (4.2.2)

Implemented:
- ☑ Data Verified (4.3)
- ☑ Headline (3.2.1)
- ☑ Capsule (3.2.2)
- ☑ Lead (3.3.4)
- ☑ Body (3.2.4)
- ☑ Quotes (3.3)
- ☑ Categorized (3.5)
- ☑ Web info (4.3)
- ☑ Pix in DB (4.5.1)
- ☑ Audio in DB (4.5.2)

---

Full Data of Current Story

Serial #: 10253  Story Name: Greyhound
Client: Quantum

This page will show all the details of this record

Original Submission Data

Source: Public

Lead Contact Info

Submitted by:

| Field | Value |
|---|---|
| First Name: | Bill |
| Last Name: | Cattell |
| Title: | Lead Network Analyst |
| Company: | Greyhound Line Inc. |
| Email: | |
| Phone: | |
| Fax: | |
| Fax Exemption Number | |

Postal Address

| Field | Value |
|---|---|
| Street Address: | P.O. Box 660362 |
| City: | Dallas |
| State: | Tx |
| Zip: | 75266 |
| Country: | USA |

Customer Info:
- First Name:
- Last Name:
- Title:
- Company:
- Email:
- Phone:
- Fax:
- Fax Exemption Number Postal Address
- Street Address:
- City:
- State:
- Zip:
- Country:

| Field | Value |
|---|---|
| URL: | http://www.greyhound.com |
| Company Size: | 5000+ |
| Industry Field: | Miscellaneous |

Does anybody need to approve this story for web use? Who?

Describe the project:
Greyhound uses LANtegrity Network Recovery Software in conjunction with Quantum DLT tape drives to back up both internal network applications and customer services like the On-Line Reservation System.

Why is this a good success story?
Speed, Capacity, Reliability

Anything more to add?

How did you hear about this project?

Entered by TEM 12/31/98

FIGURE 5A

| Tell us about the hardware and software used for this project | |
|---|---|
| Software Used | Hardware Used |
| LANtegrity | Compaq ProLiant 5000 servers<br>Quantum DLT 4000 tape drives |

Story Data

| Project Title (Visible on the Web): |
|---|
| Greyhound Network Backup |

| | |
|---|---|
| Project Company: | Greyhound Lines, Inc. |
| Project Company Size: | 5000+ |
| Project State: | TX (Texas) |
| Project Country: | U.S.A. |
| Project Creator: | Bill Cattell |

| Story Headline(Visible on the Web): |
|---|
| That's the Ticket! |

| Story Capsule (Visible on the Web): |
|---|
| Coast to coast, Greyhound riders know they can expect reliable, timely transportation. A Quantum DLTtape™ systems help keep the bus line On Line. |

| Story Lead (Visible on the Web): |
|---|
| It happens thousands of times a day – all over the US. A traveler steps up to a Greyhound ticket counter and within a few seconds is all ready for a trip – across the state or across country. Behind that efficient service is an array of efficient computer systems. And behind those computer systems, you'll find Quantum. |

| Story Body (Visible on the Web): |
|---|
| Greyhound Lines depends on an elaborate network of computers to keep the buses rolling on time. Ticket counters are linked into a system-wide passenger reservation system making possible fast, efficient service for even the most complicated route. From timetables to transfers, the Greyhound system keeps you moving and gets you where you need to be – without hassle.<br><br>Greyhound's office functions are just as efficient. The company headquarters complex in Dallas is linked by and effective Corporate Communications Network. And Dallas, in turn is connected to numerous other offices across North America through a Wide Area Network.<br><br>But what happens if there's a system crash? Does everything grind to a halt?<br><br>Not a chance. Greyhound's computer operations are backed up by a reliable Quantum DLTtape™ system.<br><br>Bill Cattell, Greyhound's network administrator, was responsible for choosing Quantum, replacing an outmoded 4mm tape backup system back in 1996. "The 4mm backup units we were using were unreliable," Bill explains. "We had backup failures and just too many midnight calls."<br><br>The replacement system needed to be fast, efficient and above all dependable. "The special problems we face in backup are based on the fact that we have so many servers to back up and such a small window of time to get the work done," notes Bill. "We don't run any backups during the day – they have to be run between 10pm and 6am the next day. We |

FIGURE 5B run incremental backups every night and full backups over the weekend. Each server has about 40 gigabytes of storage, so we have a heavy backup workload."

Using the old 4mm system meant a lot of hands-on supervision, and there were too many system failures. "We were pushing the 4mm technology too hard," admits Bill, "and it couldn't take it.

But not so with the Quantum DLTtape™ units. "With DLTtape™ autoloader backup." says Bill, "it's an entirely lights-out, hands-off operation. DLTtape™ technology can handle the workload – the benefits are speed, capacity, and reliability."

Speed, capacity, and reliability – qualities you look for in selecting transportation. That's why millions of Americans "leave the driving to Greyhound."

And that's why Greyhound leaves the backup to Quantum!

Quotes (Visible on the Web):

"The special problems we face in backup are based on the fact that we have so many servers to back up and such a small window of time to get the work done. We don't run any backups during the day – they have to be run between 10pm and 6am the next day. We run incremental backups every night and full backups over the weekend. Each server has about 40 gigabytes of storage, so we have a heavy backup workload."

"That was one of the problems with the 4mm approach -- there was just too much hands-on required. We were pushing the 4mm technology too hard and it couldn't take it."

"With DLT autoloader backup, it's an entirely lights-out, hands-off operation. DLT technology can handle the workload – the benefits are speed, capacity, and reliability."

–Bill Cattell
Lead network Analyst, Greyhound Lines Inc.

| Keywords | Markets |
|---|---|
| Networking | Quantum Market |

| Hardware Tools | Software Tools |
|---|---|
| Compaq ProLiant 5000 server<br>Quantum DLT 7000 | LANtegrity |

Contact Data that will Appear on the Web:

| First Name: | Bill | Postal Address | P.O. Box 660362 |
|---|---|---|---|
| Last Name: | Cattell | | |
| Title: | Lead Network Analyst | City: | Dallas |
| Company: | Greyhound Line Inc. | State: | Tx |
| | | Zip: | 75266 |
| | | Country: | USA |

Tel:  Email: 
Fax:  URL: http://www.greyhound.com

FAQ

Copyright 1998, The Cybercasters (America) Corp. All rights reserved

FIGURE 5C 92 110

Editor:

Initial OK:
- ☑ Requested (1.3)
- ☑ Authorized (1.4)

Copy Edit:
- ☑ Requested (4.6)
- ☑ Spell Checked (5.1.1)
- ☑ Format Checked (5.1.2)

WebReady
- ☑ Authorized (5.2)
- ☐ Spiked (1.5)

Writer:

Data Complete:

Releases:
- ☑ Verbal (2.1.3)
- ☑ Emailed (2.3)
- ☑ Fax (3.1)
- ☑ Original (4.1)

- ☑ Story data (2.1.4)
- ☑ Quotes (2.1.5)
- ☑ Web Cont. (2.1.6)
- ☑ Pix (4.2.1)
- ☑ Audio (4.2.2)

Implemented:
- ☑ Data Verified (4.3)
- ☑ Headline (3.2.1)
- ☑ Capsule (3.2.2)
- ☑ Lead (3.3.4)
- ☑ Body (3.2.4)
- ☑ Quotes (3.3)
- ☑ Categorized (3.5)
- ☑ Web info (4.3)
- ☑ Pix in DB (4.5.1)
- ☑ Audio in DB (4.5.2)

1. Rate of Submission

Serial #: 10253   Story Name: Greyhound
Client: Quantum

1.1 ☑ Assign a name to the story in the "Story Name" box

1.2 ☑ Rate the Submission:
1. Fill in the appropriate checkbox
2. Make notes of your reasoning in the Notes box

1.3 ☑ Email your Editor:
1. Use the "Save" button to store your settings in the database
2. Use this link to Email your Editor
3. Include Story's Title and Reference Number, and reasons for rating
4. Editor will respond with approval or will spike the story. Await authorization from your Editor before continuing.

1.4 ☑ Editor only: Authorize this story
1.5 ☐ Editor only: Spike story [_____] Now (Server Time Zone MmmYYYY)

[Save] [Cancel] [Save & Next] [Save & Pending]

Source    Public

Lead Contact Info

Submitted by:                                  Customer Info:

First Name: Bill                               First Name:
Last Name: Catrell                             Last Name:
Title: Lead Network Analyst                    Title:
Company: Greyhound Line Inc.                   Company:
Email:                                         Email:
Phone:                                         Phone:
Fax:                                           Fax:
Tax Exemption Number                           Tax Exemption Number Postal Address                                 Postal Address Street Address: P.O. Box 660362                Street Address:
City: Dallas                                   City:
State: Tx                                      State:
Zip: 75266                                     Zip:
Country: USA                                   Country:

URL: http://www.greyhound.com
Company Size: 5000+
Industry Field: Miscellaneous

Does anybody need to approve this story for web use? Who?

FIGURE 6A

| Describe the project: |
|---|
| Greyhound uses LANtegrity Network Recovery Software in conjunction with Quantum DLT tape drives to back up both internal network applications and customer services like the On-Line Reservation System. |

| Why is this a good success story? |
|---|
| Speed, Capacity, Reliability |

| Anything more to add? |
|---|

| How did you hear about this project? |
|---|
| Entered by TEM 12/31/98 |

| Tell us about the hardware and software used for this project | |
|---|---|
| Software Used | Hardware Used |
| LANtegrity | Compaq ProLiant 5000 server<br>Quantum DLT 4000 tape drives |

| Use this link to provide feedback to your Editor for this company's stories |
|---|

| FAQ |
|---|

| Copyright 1998. The Cybercasters (America) Corp. All rights reserved |
|---|

[Save] [Cancel] [Save & Next] [Save & Pending]

FIGURE 6B

2. Complete Info Required to Write this story

Serial #: 10253  Story Name: Greyhound
Client: Quantum

2.1 Contact the subject party of the Success Story. During the phone call:
1. ☑ Confirm accuracy of the submitted information (visible by clicking the "View Record" link on the menu bar) and obtain any information to confirm that the story is what we think it is.
2. ☑ Obtain Verbal Consent for use of story - do not proceed further until verbal consent has been received. Also confirm that a person with some authority will eventually sign the release form; there is no point in doing anything more without this verbal okay.
3. ☑ Enter the name, title and contact info of the person providing verbal consent in "Ongoing contacts for Success Stories" box.
4. ☑ Obtain any additional information required to complete the story in the blank fields on this page.
5. ☑ Obtain raw quotes necessary to do the story, plus extra quotes if possible.
6. ☑ Get the data for the person whose name should appear on the web as contact person.
7. ☑ Have them download and print the legal release form. They (or whoever has authority to sign the release) should fill it out and fax it to us, then send us the original. Double check your notes and the original submission to ensure that they have indeed got the power to sign.

The release may not be modified by anybody under any circumstances. YOU ARE NOT AUTHORIZED TO MAKE, ACCEPT OR ALLOW CHANGES OF ANY TYPE TO THE RELEASE TEXT. The office of The Cybercasters (America) Corp are the only persons authorized to accept an additional letter that allows any variation from the conditions of the standard release; please contact them if any issues should arise.

8. ☑ Arrange for them to send us pix/audio/video as appropriate; as they may be technical, please check with your editor if you have the slightest doubt about what to arrange. Make a note in the "Notes & Queries" box listing what we are supposed to be receiving.

2.2 ☑ Note the date/time, name and details of what they said about the release in the "Notes" box - it is important to document the verbal release properly.
2.3 ☑ Email the person (using the model included in the FAQ) who has given the verbal release, thanking them for their time, their verbal release and willingness to participate in the project. Also quickly confirm the important facts that they gave us, so as to ensure that everything has been correctly understood.

[Save] [Cancel] [Save & Next] [Save & Pending]

Project Data to Appear on the Web:

| | |
|---|---|
| Creator of Customer's Project: | Bill Cattell |
| Customer's Company Name: | Greyhound Lines, Inc. |
| Customer's Company Size: | 5000+ |
| State where Project is located: | TX (Texas) |
| Country where Project is located: | USA |

Editor:

Initial OK:
☑ Requested (1.3)
☑ Authorized (1.4)

Copy Edit:
☑ Requested (4.6)
☑ Spell Checked (5.1.1)
☑ Format Checked (5.1.2)

WebReady
☑ Authorized (5.2)
☐ Spiked (1.5)

Writer:

Data Complete:

Releases:
☑ Verbal (2.1.3)
☑ Emailed (2.3)
☑ Fax (3.1)
☑ Original (4.1)

☑ Story data (2.1.4)
☑ Quotes (2.1.5)
☑ Web Cont. (2.1.6)
☑ Pix (4.2.1)
☑ Audio (4.2.2)

Implemented:

☑ Data Verified (4.3)
☑ Headline (3.2.1)
☑ Capsule (3.2.2)
☑ Lead (3.3.4)
☑ Body (3.2.4)
☑ Quotes (3.3)
☑ Categorized (3.5)
☑ Web info (4.3)
☑ Pix in DB (4.5.1)
☑ Audio in DB (4.5.2)

FIGURE 7A

Project Quotes (Raw Quotes provided by Successful Customer)

The special problems we face in backup are based on the fact that we need many servers to back up and such a small window of time to get the work done," notes Bill. "We don't run any backups during the day -- they have to be .. . .

Contact Data that will Appear on the Web:

| | | | |
|---|---|---|---|
| First Name: | Bill | Postal Address: | P.O. Box 660362 |
| Last Name: | Catrell | | |
| Title: | Lead Network Analyst | City: | Dallas |
| Company: | Greyhound Line Inc. | State: | Tx |
| | | Zip: | 75266 |
| | | Country: | USA |
| Tel: | | Email: | |
| Fax: | | URL: | http://www.greyhound.com |

Use this link to provide feedback to your Editor for this company's stories

FAQ

Copyright 1998 The Cybercasters (America) Corp. All rights Reserved

[Save] [Cancel] [Save & Next] [Save & Pending]

Editor:

Initial OK:
- ☑ Requested (1.3)
- ☑ Authorized (1.4)

Copy Edit:
- ☑ Requested (4.6)
- ☑ Spell Checked (5.1.1)
- ☑ Format Checked (5.1.2)

WebReady
- ☑ Authorized (5.2)
- ☐ Spiked (1.5)

Writer:

Data Complete:

Releases:
- ☑ Verbal (2.1.3)
- ☑ Emailed (2.3)
- ☑ Fax (3.1)
- ☑ Original (4.1)

- ☑ Story data (2.1.4)
- ☑ Quotes (2.1.5)
- ☑ Web Cont. (2.1.6)
- ☑ Pix (4.2.1)
- ☑ Audio (4.2.2)

Implemented:
- ☑ Data Verified (4.3)
- ☑ Headline (3.2.1)
- ☑ Capsule (3.2.2)
- ☑ Lead (3.3.4)
- ☑ Body (3.2.4)
- ☑ Quotes (3.3)
- ☑ Categorized (3.5)
- ☑ Web info (4.3)
- ☑ Pix in DB (4.5.1)
- ☑ Audio in DB (4.5.2)

3. Write the Story

Serial #: 10253  Story Name: Greyhound
Client: Quantum 3.1 ☑ Confirm the fax release has arrived (or the original hardcopy.) don't do work on this story until the release is in our hands.

3.2 Write the story - use the following fields:
1. ☑ Headline
2. ☑ Capsule Summary (ie. one line description)
3. ☑ Lead (ie. the first paragraph of the story)
4. ☑ Story Body (ie. second paragraph till end of story).

3.3 ☑ Spellcheck all the text in the record.

3.4 ☑ Assign the appropriate keyword/s, Market Segments, company size, etc. to record. Avoid using more than 5 keywords per story.

3.5 ☑ Do whatever is still required to obtain the final release form.

3.6 ☐ Follow up on any images, audio and/or video that were supposed to be used 3.7 Follow up on the media that you've arranged for this story (see 2.1.8)

[Save] [Cancel] [Save & Next] [Save & Pending]

134

Project Title (Visible on the Web):
Greyhound Network Backup

Story Headline (Visible on the Web):
That's The Ticket!

Story Capsule (Visible on the Web):
Coast to coast, Greyhound riders know they can expect reliable, timely transportation. And Quantum DLTtape

Story Lead (Visible on the Web):
It happens thousands of times a day -- all over the US. A traveler steps up to a Greyhound ticket counter and within a few seconds is all ready for a trip across the state or across the country. Behind those computer systems, you'll . . .

Story Body (Visible on the Web):
Greyhound Lines depends on an elaborate network of computers to keep rolling on time. Ticket counters are linked into a system-wide passenger reservation system making possible fast, efficient service for even the most complicated route. From timetables to transfers, the Greyhound system keeps moving and gets you where you need to be -- without hassle.

Greyhound's office functions are just as efficient. the company headquarters complex in Dallas is linked by an effective Corporate Communications network. Dallas, in turn, is connected to numerous other offices across North America through a Wide Area Network.

Project Quotes (Raw Quotes provided by Successful Customer)
"The special problems we face in backup are based on the fact that we use servers to back up and such a small window of time to get the work done," says Bill. "We don't run any backups during the day -- they have to be run between 10pm and 6am the next day. We run incremental backups every night and full

FIGURE 8A

Quotes (Visible on the Web)

"The special problems we face in backup are based on the fact that we have servers to back up and such a small window of time to get the work done. We don't run any backups during the day -- they have to be run between 10pm and 2am the next day. We run incremental backups every night and full backups over the weekend. Each server has about 40 gigabytes of storage, so we have a heavy backup.

"That was one of the problems with the 4mm approach -- there was just too much hands on required. We were pushing the 4mm technology too hard and it showed it.'

"With DLT autoloader backup, it's an entirely lights-out, hands-off . . .

| Keyword | | Selected Keyword |
|---|---|---|
| Art<br>Banking and Finance<br>Broadcasting<br>Education<br>Engineering<br>Entertainment<br>Film Production<br>Fitness | Add<br><br>Remove | Networking |

Add/Edit Keyword

| Market | | Selected Market |
|---|---|---|
| Quantum Market | Add<br><br>Remove | Quantum Market |

Add/Edit Market

Use this link to provide feedback to your Editor for this company's story

FAQ

Copyright 1998 The Cybercasters (America) Corp. All Rights Reserved

[Save] [Cancel] [Save & Next] [Save & Pending]

Editor:

Initial OK:
- ☑ Requested (1.3)
- ☑ Authorized (1.4)

Copy Edit:
- ☑ Requested (4.6)
- ☑ Spell Checked (5.1.1)
- ☑ Format Checked (5.1.2)

WebReady
- ☑ Authorized (5.2)
- ☐ Spiked (1.5)

Writer:

Data Complete:

Releases:
- ☑ Verbal (2.1.3)
- ☑ Emailed (2.3)
- ☑ Fax (3.1)
- ☑ Original (4.1)

- ☑ Story data (2.1.4)
- ☑ Quotes (2.1.5)
- ☑ Web Cont. (2.1.6)
- ☑ Pix (4.2.1)
- ☑ Audio (4.2.2)

Implemented:

- ☑ Data Verified (4.3)
- ☑ Headline (3.2.1)
- ☑ Capsule (3.2.2)
- ☑ Lead (3.3.4)
- ☑ Body (3.2.4)
- ☑ Quotes (3.3)
- ☑ Categorized (3.5)
- ☑ Web info (4.3)
- ☑ Pix in DB (4.5.1)
- ☑ Audio in DB (4.5.2)

140

4. WebData - Complete Web Display Data

142

Serial # 10253  Story Name: Greyhound
Client: Quantum

4.1 ☑ Confirm that the original hardcopy release has arrived.
4.2 Confirm arrival of the images/audio/video that were supposed to come in - follow up if they haven't. Check we've begun our internal processing to prepare them for the Web
    1. ☑ Images
    2. ☑ Audio and/or Video
4.3 ☑ Verify that all the information required for the Web is complete and confirmed accurate.
4.4 ☑ Fill in the Definitive hardware and software listings (to be visible on the Web). Add new products and companies as necessary.
4.5 Confirm that the image/audio/video materials are ready to publish. Fill in the links for these materials.
    1. ☑ Image material
    2. ☑ Audio/Video materials
4.6 ☑ When you've completed all of the above, notify your editor that this story is ready for CopyEdit and Final OK - include the story number and name in the subject when you send your email.

[Save] [Cancel] [Save & Next] [Save & Pending]

Software Used (as submitted)

LANtegrity

| Software | | Software (Visible on the Web) |
|---|---|---|
| 3D Nation<br>ACT!<br>Adobe Photoshop<br>Adobe Premiere<br>After Effects<br>AfterImage<br>Apache<br>AppleShare | Add<br><br>Remove | LANtegrity |

[Add/Edit Software Product]  [Add/Edit Manufacturer]

Hardware Used (as submitted)

Compaq ProLiant 5000 servers
Quantum DLT 4000 tape drives

FIGURE 9A

| Hardware | | Hardware (Visible on the Web) |
|---|---|---|
| ADIC Scalar 458 Library<br>ADIC Scalar DLT Libraries<br>AMD166 Processor<br>AMD486 Processor<br>AMDP - 100 Processor<br>ATL Library<br>Adaptec AAA133 RAID con<br>Alpha | Add<br><br>Remove | Compaq Proliant 5000 server<br>Quantum DLT 7000 |

| Add/Edit Hardware Product | Add/Edit Manufacturer |
|---|---|

This area to allow insertion of filenames for images, audio and video (as appropriate)

Use this link to provide feedback to your Editor for this company's stories

FAQ

Copyright 1998. The Cybercasters (America) Corp. All rights reserved.

| Save | Cancel | Save & Next | Save & Pending |

FIGURE 9B

5. Copy Editing (Editor Use Only)

Serial #: 10253  Story Name: Greyhound
Client: Quantum

5.1 Editor's CopyEdit - Check everything and confirm that the story is ready to publish.
  1. ☑ Spellcheck everything
  2. ☑ Check for format errors, duplicate spaces, excess carriage returns, etc.

5.2 ☑ Editor - activate WebReady status
5.3 ☐ Editor - set Online Date
  [ ] Now or Offline (Server Time Zone DD Mmm YYYY)

5.4 Editor - set story as Featured Story if required
  From: [ ] (Server Time Zone DD MmmYYYY)
  To: [ ] (Server Time Zone DD MmmYYYY)

[Save] [Cancel] [Save & Next] [Save & Pending]

---

This area to sub used to display all the fields that will be displayed over the Web to all one final copy edit of the web visible materials

Company Greyhound Lines, Inc

Project Name Greyhound Network Backup

Title That's the Ticket!

Description Coast to coast, Greyhound riders know they can expect reliable, timely transportation. And Quantum DLTtape™ systems help keep the bus line On Line.

Lead It happens thousands of times a day -- all over the US. A traveler steps up to a Greyhound ticket counter and within a few seconds is all ready for a trip -- across the state or across country. Behind that efficient service is an array of efficient computer systems. And behind those computer systems, you'll find Quantum.

Body Greyhound Lines depends on an elaborate network of computers to keep the buses rolling on time. Ticket counters are linked into a system-wide passenger reservation system making possible fast, efficient service for even the most complicated route. From timetables to transfers, the Greyhound system keeps you moving and gets you where you need to be -- without hassle.

Greyhound's office functions are just as efficient. The company headquarters complex in Dallas is linked by and effective Corporate Communications Network. And Dallas, in turn is connected to numerous other offices across North America through a Wide Area Network.

But what happens if there's a system crash? Does everything grind to a halt?

Not a chance. Greyhound's computer operations are backed up by a reliable Quantum DLTtape™ system.

Bill Cattell, Greyhound's network administrator, was responsible for choosing Quantum . . .

---

Editor:

Initial OK:
☑ Requested (1.3)
☑ Authorized (1.4)

Copy Edit:
☑ Requested (4.6)
☑ Spell Checked (5.1.1)
☑ Format Checked (5.1.2)

WebReady
☑ Authorized (5.2)
☐ Spiked (1.5)

Writer:

Data Complete:

Releases:
☑ Verbal (2.1.3)
☑ Emailed (2.3)
☑ Fax (3.1)
☑ Original (4.1)

☑ Story data (2.1.4)
☑ Quotes (2.1.5)
☑ Web Cont. (2.1.6)
☑ Pix (4.2.1)
☑ Audio (4.2.2)

Implemented:
☑ Data Verified (4.3)
☑ Headline (3.2.1)
☑ Capsule (3.2.2)
☑ Lead (3.3.4)
☑ Body (3.2.4)
☑ Quotes (3.3)
☑ Categorized (3.5)
☑ Web info (4.3)
☑ Pix in DB (4.5.1)
☑ Audio in DB (4.5.2)

FIGURE 10A

Quotes "The special problems we face in backup are based on the fact that we have servers to back up and such a small window of time to get the work done. We don't rim any backups during the day -- they have to be run between 10pm and 2am the next day. We run incremental backups every night and full backups over the weekend. Each server has about 40 gigabytes of storage, so we have a heavy backup.

"That was one of the problems with the 4 mm approach -- there was just too much hands-on required. We were pushing the 4 mm technology too hard and it couldn't take it."

Hardware and OS Software Used

Hardware

| Hardware | | Selected Hardware |
|---|---|---|
| ADIC Scalar 458 Library<br>ADIC Scalar DLT Libraries<br>AMD 166 Processor<br>AMD 486 Processor<br>AMD P - 100 Processor<br>ATL Library<br>Adaptec AAA133 RAID con<br>Alpha | Add<br><br>Remove | Compaq Proliant 5000 server<br>Quantum DLT 7000 |

Software Used

| Software | | Software (Visible on the Web) |
|---|---|---|
| 3DNation<br>ACT!<br>Adobe Photoshop<br>Adobe Premiere<br>After Effects<br>AfterImage<br>Apache<br>AppleShare | Add<br><br>Remove | LANtegrity |

FIGURE 10B

Contact Information

| | |
|---|---|
| Contact Person | Bill |
| | Cattell |
| Title of Contact Person | Lead Network Analyst |
| Contact Company Name | Greyhound Lines |
| Contact Company Country | USA |
| Website | http://www.greyhound |
| Contact Tel. | |
| Contact E-mail | |
| Contact Fax | |
| Postal Address | P.O. Box 6660362 |
| Contact City | Dallas |
| Contact State | TX |
| Contact Zip | 75266 |
| Contact Country | USA |

Project Description

| | |
|---|---|
| Company Name | Greyhound Lines, Inc |
| Project Author | Bill Cattell |
| Project Name | |
| Company Size | 5000+ |
| State | TX (Texas) |
| Country | USA |

FIGURE 10C

Category

Market  　　　　　　　　　　Selected Market

| Quantum Market | Add | Quantum Market |
|---|---|---|
|  | Remove |  |

Keywords

Keyword  　　　　　　　　　　Selected Keyword

| Art<br>Banking and Finance<br>Broadcasting<br>Education<br>Engineering<br>Entertainment<br>Film Production<br>Fitness | Add<br><br>Remove | Networking |

Copyright 1998. The Cybercasters (America) Corp. All rights reserved

[Save] [Cancel] [Save & Next] [Save & Pending]

FIGURE 10D

Search Page

1. Fill in the form below to search for stories that fulfill the criteria that you want to find. Wildcard searches can be done using a "*" sign to indicate that any character/s will satisfy the search criteria.

| Field to search on: | Criteria to Search on: | |
|---|---|---|
| Story as WebReady: | | ☐ Yes |
| Serial No.: | is | |
| Storyname: | is ▼ | |
| Projectname: | is ▼ | |
| Client: | is | ▼ |
| Company: | is | |
| State: | is | ▼ |
| Country: | is | ▼ |
| Ticklerdate: | is ▼ | (DD Mmm YYYY) |
| Onlinedate: | is ▼ | (DD Mmm YYYY) |
| Cool Story Date: | is ▼ | (DD Mmm YYYY) |
| Include Graveyard Stories: | ☐ Yes | |

| Market | | Search for Market | |
|---|---|---|---|
| Quantum Market<br>Small Business<br>Enterprise<br>K-12<br>New Media & Entertainment<br>Publishing<br>Scientific & Engineering<br>Health Care | | Add<br><br><br>Remove | |

FIGURE 11A

STORY WORKFLOW MANAGEMENT SYSTEM AND METHOD

This application claims benefit of Provisional Application No. 60/125,982 filed Mar. 24, 1999.

BACKGROUND OF THE INVENTION

This invention relates generally to a system and method for managing the workflow associated with a story and in particular to a system and method for managing the workflow associated with the preparation, editing and creation of a story.

In a typical environment in which a story may be created, such as a newspaper, a television newscast, a cable service, or a company who is generating success stories associated with their products, the management of the workflow associated with the creation of a story is very difficult. In particular, the creation of a story may include receiving a submission for a new story, rating the story idea, checking the story's facts, writing the story and preparing the story for publishing. In the past, each step of the process was completed by one or more different people, but no one was easily able to monitor the entire story workflow process. Therefore, it is difficult to ensure that the entire process was completed correctly and that each step was in fact completed. It is also difficult for a person trying to manage the story workflow to ensure each step is being completed in a timely manner. It is also difficult to ensure that each story being generated is factually accurate. Finally, it is also difficult to implement a quality control process due to the large number of steps in the process and the large number of people involved in the process.

For a company which generates success stories about its products, the story workflow management process is equally complex. In this process, it is necessary to screen incoming success story submissions to remove the unwanted submissions. Then, it is necessary to check the submission's accuracy and, if the submission is accurate, the writing of the success story must be assigned to a writer. The writer then has to check all the facts (i.e. find the person, get the story and quotes, get the appropriate releases, get images and other media as required, have those media prepared for publication, etc.) and get everybody to sign off on what's been done. Once the writer has completed the story, it must be edited and prepared for publication. In a typical success story creation process within a corporation, the submissions for success stories are difficult to obtain. In particular, it is typically necessary to disturb the salespeople in order to generate any leads for success stories since the salespeople have the most contact with people who may have success stories with the products made by the corporation. Often, the person administering the success story creation process must provide the salespeople with an incentive, such as a cash bonus or some other material prize, in order to receive any success story leads or submissions. The management of the success story process is often done manually which is a daunting task.

Corporations which have success story programs also find it immensely difficult to ensure that stories are currently maintained up to date and accurate (i.e., the featured party is still using the same products and the same people are still with the company, etc.). It is staggering to discover how many of the success stories that a company uses are actually obsolete. In addition, because the success story creation work is done in an artisanal manner right now, it's also difficult, time consuming (i.e. expensive) to get the story done in multiple media (print, web) in a useful time frame. It is also extremely difficult for companies to ensure that their people can quickly find a relevant success story when they need one. In addition, because the stories usually take the months from inception to delivery of a usable story, their shelf life (before they become obsolete) is much shorter.

Many companies already have a success story program. In one type of success story program, one or more people in the organization are assigned to find and develop leads and turn them into stories. These people usually have one or more other assigned tasks which are their primary responsibility, and usually lack training in the skills required to do success stories. The results of this type of success story program is slow story turnaround, poor quality stories, few and often outdated stories, poor legal documentation and high hidden costs. The stories are also generally handled at a divisional level and therefore never centralized in a useful manner. In another success story program, the persons assigned to find and develop leads and turn them into stories bring in one or more outside contractors, such as individual freelancer writers, PR companies, or the like. Companies consistently find the turnaround slow, quality very variable and cost high because the process always tends to be that of a craftsman working on a very limited number of leads assigned by the project manager at the company. As a result, there is often very little filtering of mediocre stories since there are not enough story submissions.

It is desirable, however, to provide a story workflow management system which automatically tracks each step of the story creation process and documents the steps as the story is being written regardless of who or how many people complete a particular task and therefore permits the story workflow to be more easily controlled. It is also desirable to provide a story workflow management system which gathers story submissions from the end users of the products and provides a mechanism for processing the story submissions that may be easily integrated into a corporation's network. Thus, it is desirable to provide a story workflow management system which avoid the above problems with the typical story creation process and it is to this end that the present invention is directed.

SUMMARY OF THE INVENTION

Thus, in accordance with the invention, a story workflow management system and method are provided in which each step of the story creation process from initial lead generation to final publication of the story is tracked so that the entire story creation process is more easily managed. The system integrates the various story creation processes into a single controlled process. The system permits the traditional story generation process to be automated and the speed of the story generation increased while the quality control for the stories is also increased. The integrated system provides various advantages to the story creation process including reduced costs to create a story, increased speed with which a story is prepared, and various features not typically available to a story writer. The system is also robust, compatible with other existing systems and networks and it very flexible.

In the success story embodiment, the end users may submit story submissions to the system about particular products and the system may provide a mechanism for processing the incoming submissions ideas and leads in an efficient manner. The system may store unformatted story contents so that the published story may be quickly published automatically by the system in a variety of different formats, such as a hardcopy of the story, a Postscript Display Format (PDF) file and the like. The system may also permit leads for story submissions to be tracked so that a lead for a new story is not lost. The system also may be easily integrated into a corporate Intranet computer network and with other prior legacy databases. The system may also gather together the success stories spread throughout a corporation.

The system also allows for more time and space flexibility for everybody in the process since the story creation is not constrained by location or time (i.e., everybody can work on it from anywhere at any time). The system also reduces the dependency on any one individual because this is a formalized system and the steps are defined and documented so that less skilled people may accomplish the same tasks typically completed by a more skilled person. The system is also easy scaled in size to increase the number of stories being created. The system also accumulates a central knowledge base for continually improving the story creation process based on ongoing experiences. In addition, since the system may track visitors through the integrated web system, the system may track the visitor's interests and preferences and provide feedback to our customers which allows them to tune their marketing and products. The system permits a large number of story submissions to be generated so that the best stories (high quality control) may be picked from the submissions to create the stories.

In more detail, the system may include a server which is executing one or more software applications which implement various steps in the story creation process. The software applications may include a submission application for managing the story submission process, a writer application for managing the story rating and story creation process, an administrative application for controlling the access to the system and editorial review as well as managing and maintaining the data contained in the database space,and a publisher application for generating a published story in a variety of different formats. The system may also include a database for storing information about each submission and each completed story. The administrative system provides an overview of the system for an administrator, allows control of certain system data, controls the user permissions to access particular data so that different people who access the system may be able to view different information about the stories being prepared based on the privileges given to the person. For example, a particular corporation may view only the stories pertaining to the particular corporation while the system may actually be generating stories for multiple corporations. To control the access to the information, the system may include an access database containing information about the web pages available in the system. The database may also include each different access level in the system and what web pages each different user may view. For example, a person submitting a story may only access and view the submission web pages while an editor may view all of the current stories being processed and their progress towards completion (see FIGS. 4A and 4B for example).

The system may have a user interface which is generated to provide users of the system, including story submitters, story researchers, story writers, story editors, system administrators, system customers, sub-contractors, partners and others, with guidance through the process. In one World Wide Web (WWW) based embodiment, one or more web pages are generated as the user interface. The system may generate these user interface screens dynamically as each user accesses the system. In particular, each user accessing the system may have a predetermined security level based on the user's intended use of the system. Based on the predetermined security level, pieces of data are retrieved from a database and the user interface for the particular user is generated based on the retrieved data. Thus, each user only views the data in the user interface screen which the user has the privileges to view to provide security for the stories being generated. Additionally, the user interface screens in the system are customizable to integrate seamlessly with the current look and feel of a customer's web site, for example, so that not only can different content be made accessible to different users based on the access privileges, but different versions of the same content as well as different presentations of that content may be provided to different users.

To generate leads for possible stories, the system may receive a submission form through the submission application system. In addition, the system may include a pre-qualification system for finding and generating leads and following up on the leads to have them pre-qualified (i.e., determine that the story is valuable and should be created. Once the stories have passed this pre-qualification, the system requests a submission from the featured person, and this submission is matched with the data from the pre-qualification and tracking system. This integrated pre-qualification and tracking system is valuable to clients because it provides their project managers with a simple method of generating leads and ensuring that leads don't fall through the cracks once they have signed off on them.

BRIEF DESCRIPTION OF THE DRAWINGS

FIGS. 2A–2C are diagrams illustrating an example of a submission form in accordance with the invention;

FIG. 3 is a diagram illustrating an example of a release form;

FIGS. 4A and 4B are diagrams illustrating an example of the initial screen of the writer application in accordance with the invention showing the status of the stories;

FIGS. 5A–5C are diagrams illustrating an example of a user interface page showing information about a particular story being prepared using the system;

FIGS. 6A and 6B are diagrams illustrating an example of a user interface page for managing the submission rating process in accordance with the invention;

FIGS. 7A and 7B are diagrams illustrating an example of a user interface page for managing the gathering of additional information (i.e., the researching of the story) required to write the story in accordance with the invention;

FIGS. 8A and 8B are diagrams illustrating an example of a user interface page for managing the writing of the story in accordance with the invention;

FIGS. 9A and 9B are diagrams illustrating an example of a user interface page for managing the story publication preparation process in accordance with the invention;

FIGS. 10A–10D are diagrams illustrating an example of a user interface page for managing the story editing process in accordance with the invention; and FIGS. 11A and 11B are diagrams illustrating an example of a user interface page for searching for stories within the system.

DETAILED DESCRIPTION OF A PREFERRED EMBODIMENT

The invention is particularly applicable to a system for managing the workflow for the creation of success stories for a corporation or other entity and it is in this context that the invention will be described. It will be appreciated, however, that the story workflow management system and method in accordance with the invention has greater utility, such as to any other type of stories which may include news feature stories, magazine articles, wire service articles and the like. The system is also applicable to other fields besides success stories, such as press relations (e.g., providing stories and information for the media), marketing (e.g., providing information for use by salespeople and telemarketing people), e-marketing (e.g., tying stories with products or solutions on the web), marketing (e.g., providing accurate end-user information to a company about how the end-users really use the company's products and why end-users like the products, customer education (e.g., stories about the profession and/or services provided), or human resources (e.g., to improve employee morale and communications as well as education).

Figure 1:
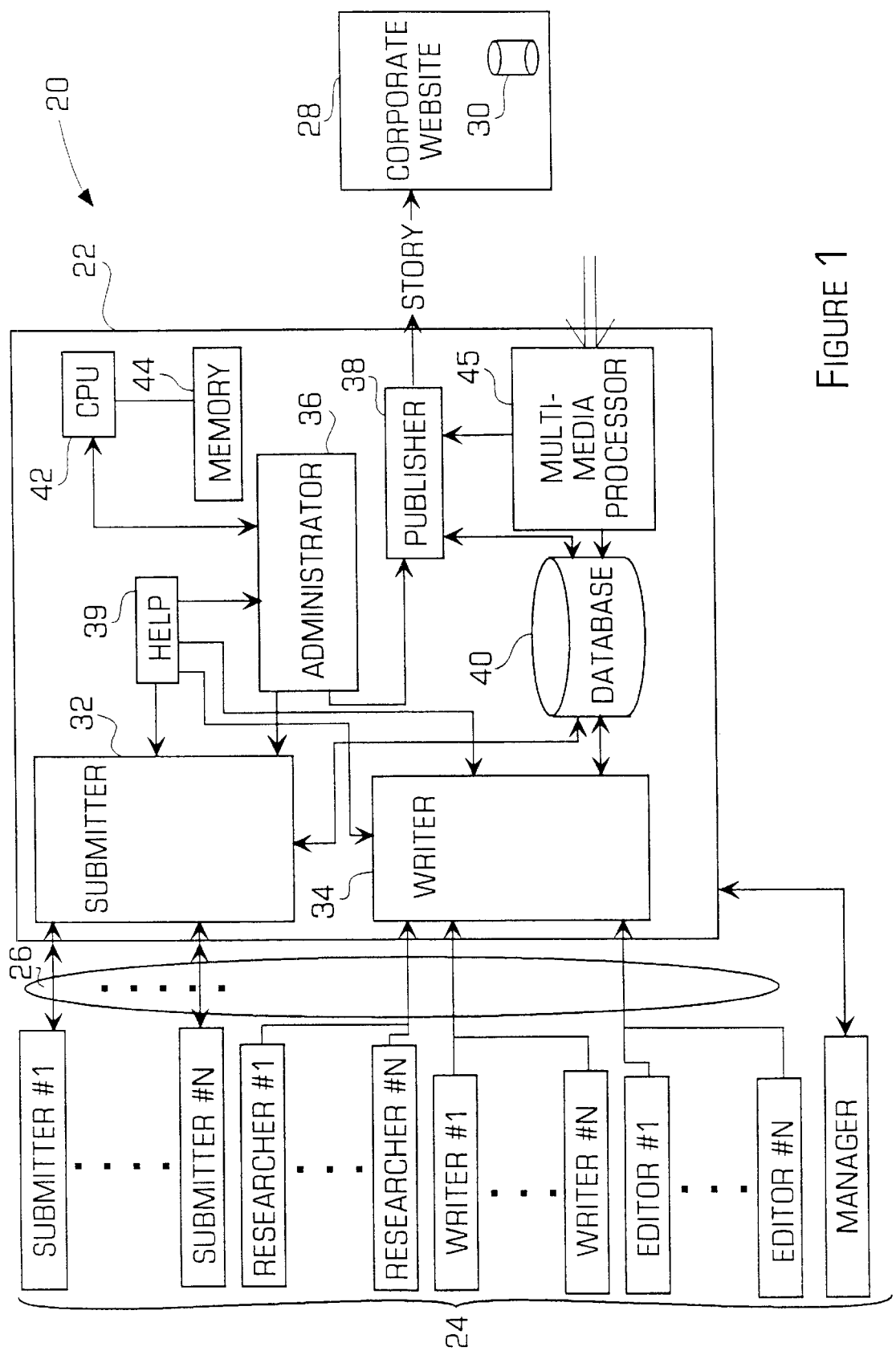
FIG. 1 is a block diagram of a story workflow management system in accordance with the invention.

FIG. 1 is a block diagram of an example of a story workflow management system 20 in accordance with the invention. The system 20 may include a server 22 and one or more client computers 24 connected to the server by a computer network 26, such as the Internet or a corporate Intranet. The server 22 may house one or more sub-systems which generate a user interface and perform some of the steps of the story creation process as described below in more detail. Each client computer 24 may be a typical personal computer having a central processing unit which executes a browser application so that the user of the client computer may log onto the server 22. In the example shown, the users of the client computers may include different people who may have different privilege or access rights to the data stored on the server. The different people may include one or more people who submit stories to the system (Submitter #1–Submitter #N), one or more story researchers writers (Researcher #1–Researcher #N) who research the story submissions, one or more writers (Writer #1–Writer #N) who write the stories (in some cases the story research and story writing may be done by the same person), one or more Editors (Editor #1–Editor #N) who oversee and edit these stories and a corporate manager (Manager) who wishes to review the current stories being processed for a particular corporation.

Once the user of the client computer has logged onto the server, the user may interact with the various story creation systems, which may be software applications being executed by the server, by viewing information located on the server and providing information to the server. For example, a submission system as described below may be intelligent and may modify its actions or the data it displays based on the privileges of the user who requests the data. When a story submission has been made, the forms content can be checked to ensure that certain minimum content requirements have been provided and an acknowledgment and receipt are automatically generated for the submitter or a request to fix any problems is generated. All of the submitted data may be automatically transferred into the workflow production system with an original copy of the submission data being preserved as write-only to ensure that it cannot be modified. An on-line help system is available to help user through the submission system.

In the success story embodiment of the management system shown in FIG. 1, the resultant story (STORY) may be output over a communications link, such as the Internet or e-mail, to a corporate web site 28 which stores the finished success stories in a database 30 and displays the success stories to client computers who access the corporate web site. The system may also store a copy of the story in its own database as described below. The system may also publish the story on its own success story website. The story, in accordance with the invention may be sent to the corporate web site using a variety of different delivery techniques, such as via fax, FedEx or anything else. In a preferred embodiment, the story is stored in the system's database and the corporate site's system requests a page containing a story from the system and then displays the story page within their website. Alternatively, the final version of the story is stored on a database in the corporate website maintained by the system and data is published locally into their website.

In accordance with the invention, each of the story creation sub-systems, as described below, may operate independently of each other so that stories, for example, may be submitted at any time from anywhere in the world and automatically stored in the database. In addition, the story creation process, as described below, is broken into a plurality of independent steps some of which may be performed out of order and at any time. The system automatically keeps track of the completed and uncompleted steps so that any authorized user of the system, such as researchers, writers, editors, administrators, customers, partners, etc., may quickly determine the status of any story. In addition, the system permits the steps to be completed at any time of the day or night to suit the work habits of different people. Now, more details of the sub-systems in the server will be described.

The server 22 may include a submission application system 32, a writer system 34, an administration/security system 36, a publisher system 38, a help system 39, a database 40, a central processing unit (CPU) 42, a memory 44 and a multi-media processing system 45. The memory 44 may include any type of data storage system such as a semiconductor memory, such as a RAM, EEPROM, ROM or the like, a hard disk drive system, a tape drive storage system or the like. In the example shown, the submission application system, the writer system, the security system and the publisher system may be software applications stored in the memory 44 of the server and the software applications are executed by the CPU 42 of the server. The system may also include a reporter system (not shown) which may sort the data in the database and/or in the pages being displayed to a user.

The submission application system 32 may generate a user interface, as described in more detail below with reference to FIGS. 2A–2C, to gather information from a user about a possible story idea (a submission). The submission application system 32 automatically store the gathered information in the database 40 in a new story record with a unique numeric identifier. The submission application system may also include a lead generation system which may, for example, automatically generate messages, such as e-mail messages or Usenet postings, requesting that users submit story submissions. For example, the submission application system may automatically post a message to a Usenet group relating to a particular product requesting success story submissions for the product or an editor using the system may also attempt to generate new leads. In this manner, the system 20 attempts to gather new story submissions from the users of the products. The submission application system 32 may also direct the user submitting a story, in certain circumstances, to fill out and send in a release form as will be described below with reference to FIG. 3.

The writer system 34 may permit a writer to rate the story submissions stored in the database, to manage the fact gathering process (i.e., researching the story) if the story submission is approved by an editor and to manage the writing of the story by a writer, and to manage the final pre-publications processing of a completed story. The writer system may also permit an editor to manage all of the writer stages of the story creation process including the final pre-publication processing of a completed story, and to edit or kill the story at any time during the story generation process. The details of these functions will be described below with reference to FIGS. 4–11. At various stages during the generation of the story, the information about the story is stored in the database 40. The database also stores information about the status of each pending story.

The administrator system 36 may control the access to the submission application and writer systems. For example, the user accessing the submission application system 32 cannot access any information about other stories stored in the database using the submission application (since they do not have the appropriate privileges) while a writer, researcher or editor of stories may be able to access his/her own story and brief information about other stories. As another example, a supervisory editor may be able to access detailed information about every story to check the progress of each story and possibly send a reminder to a writer who has not completed a story, for example. Thus, a plurality of different security levels may be assigned to different users of the system to ensure that a particular user only views data which the user has the appropriate privileges to view. The administration system 36 also performs data maintenance and management functions. In particular, the user of the administration system may have the privileges to modify or delete data within the database which other users cannot modify or delete.

The publisher 38 may generate a downloadable version of the generated success story so that a salesman, for example, may take a hard copy of the success story along with him on a sales visit. The publisher may also forward the completed, ready-to-be-published success story to the corporate web site 28. The help system 39 may provide the users of the system with on-line help with any of the systems at any time in addition to step-by-step instructions provided in the user interface screens. The database 40 may store various pieces of information about each story including the steps completed in the story creation process, the submitted story idea, the written story and information about the person who submitted the story. The database may also store each completed story to keep a complete record of each completed story as well as a morgue archive and a graveyard archive (i.e., one or more levels of archives). The morgue archive may contain stories which are too old and no longer published while the graveyard archive may contain stories and story information which was spiked, as described below, or never made it past the initial rating process as described below.

The database 40 may also store the information about each user of the system including his/her access level and the information necessary to generate the user interface pages shown to each user. In particular, the user interface pages generated for a particular user are dynamically generated as the user logs into the system based on the pieces of data in the database and the security level of the particular user. For example, a user from a particular corporation may log into the system and be able to view only the stories associated with that corporation although the system may contain stories for a plurality of different corporations. Now, the multimedia processor system 45 will be described in more detail.

The multimedia processor system 45 may receive multimedia (e.g., images, video, audio, animation, etc.) for a particular story and store the multimedia in the database 40. A unique identifier may be generated for each piece of multimedia received to identify the story with which the multimedia is associated. The multimedia may then be processed to fit into the publication requirements of the system and published with the story once the story has been completed. The various systems described above provide an automatic document flow process in that a story in the system is automatically guided through the system and will appear in the pending page of a user automatically. Now, the submission application system and an example of a release page will be described.

FIGS. 2A–2C are diagrams illustrating an example of a submission form 50 in accordance with the invention and FIG. 3 is a diagram illustrating an example of a release form 52. The submission form 50 may include various user input blocks into which the user of the submission application system may enter information about the success story being submitted. The information may include contact information about the submitter, contact information about the person who knows more details about the success story, contact information about someone who needs to give permission to generate the story, information about the story and why it should be written, information about a website which may contain more information, information about the industry of the submitter's company, the size of the submitter's company, information about the hardware and software used during the project, information about how the product helped the submitter succeed, information about other websites to visit for information and information about how the submitter heard about the success story program as shown in FIGS. 2A–2C. The information gathered by the submission form, once submitted, is automatically stored in the database 40 shown in FIG. 1 and a new story submission record is created so that the a story submission review process may be completed.

The story submission process may include an initial screening by a writer who makes a recommendation for the rating of the story submission and documents this recommendation. The writer may also give the story submission a working title and handles some of the other minor administrative tasks associated with processing a story submission. Once the writer enters the initial recommendation into the system, the editor is automatically notified of this rating and accepts or modifies the writer's recommended rating. In particular, the system may automatically place the story in the editor's Pending page (as described below) until the editor makes his decision about the rating. Then once the editor either gives the okay to proceed with the story, the story is automatically placed back into the assigned writer's Pending page (inbasket) or a researcher's inbasket, as appropriate. If the editor spikes the story, the story goes into the graveyard archive.

Once the writer has reviewed the submission and received the editor's approval to proceed, the submission application system may send the release form 52 to the submitter or the appropriate person or organization featured in the story via e-mail or direct the submitter or the featured person or corporation to a website so that the release form may be downloaded. The submitter or featured person or corporation is then requested to review the release form and sign and date it. Once the form is executed, the submitter is asked to submit the release form, via facsimile and an original copy by mail, to an address. The release form 52 shown is a typical release (©uantum Corporation),which permits the system's use of the submitter's information. Now, the writer system will be described in more detail. The writer system may generate a plurality of user interface pages, shown in FIGS. 4–11, which manage the story creation process. Each of the writer pages may include a notes section (not shown) which permits the person using the page to enter notes about the story.

Figure 4A:
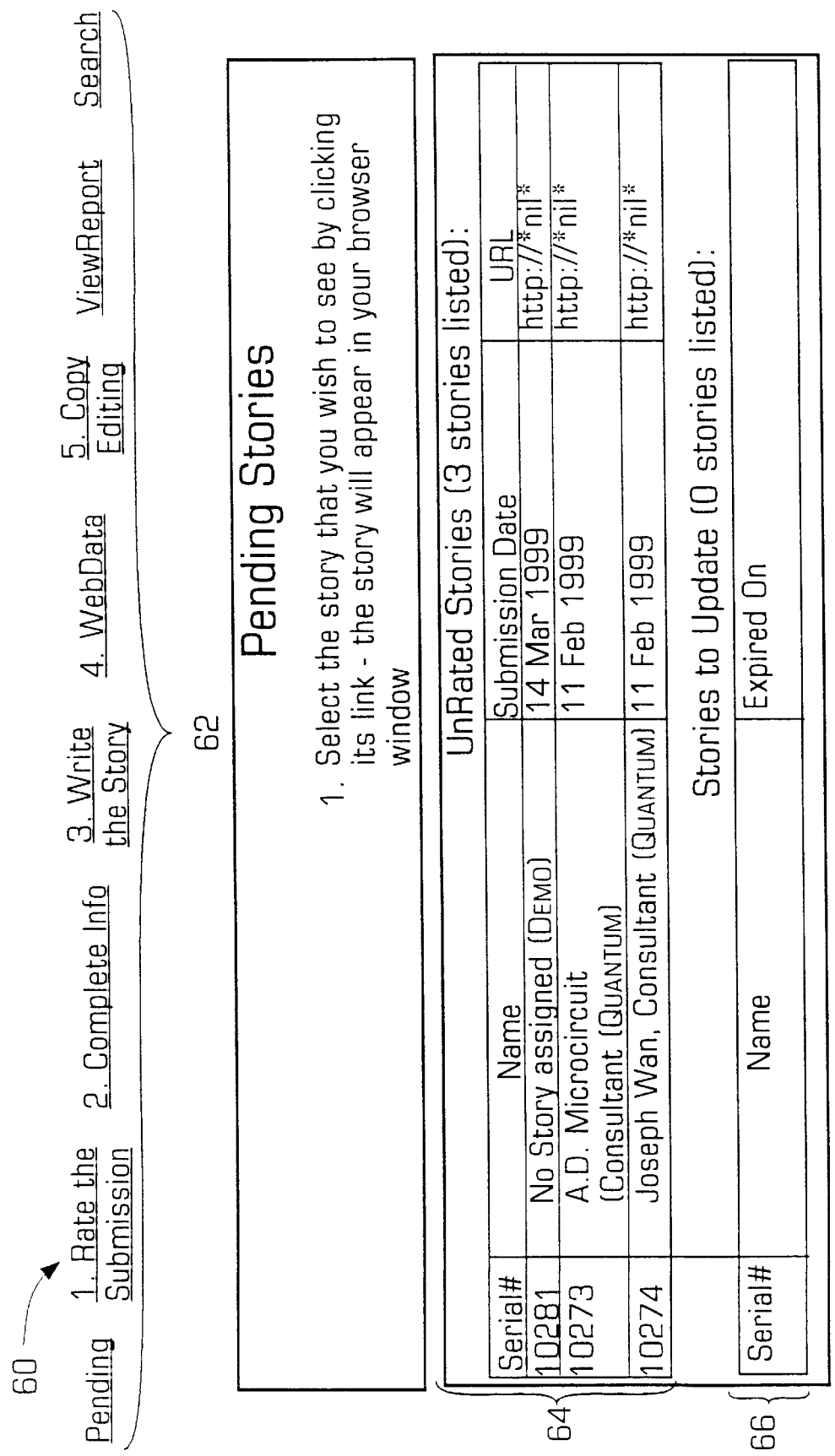
Figure 11B:
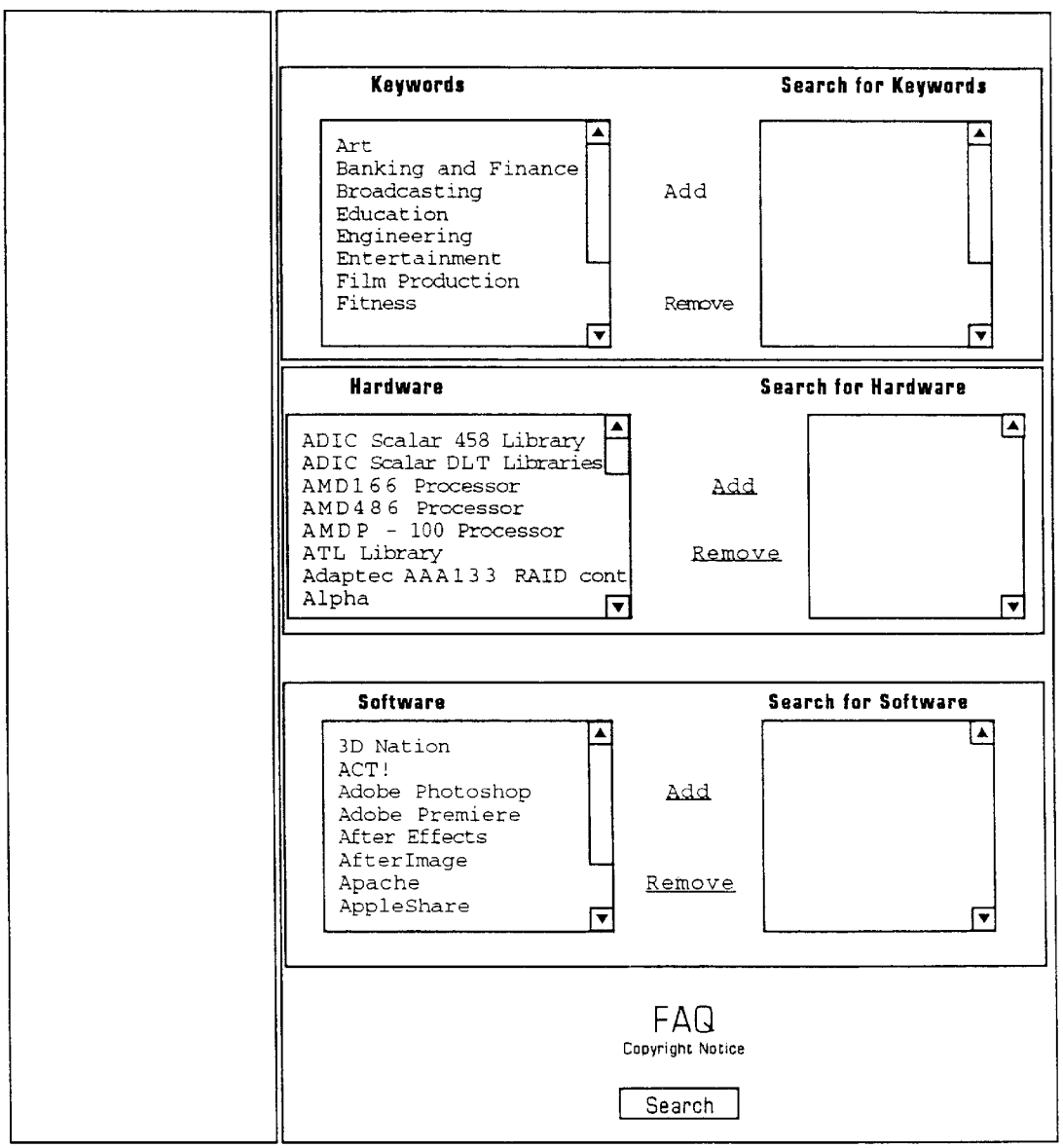

FIGS. 4A and 4B are diagrams illustrating an example of a status page 60 for the writer system in accordance with the invention showing the status of the stories currently being prepared by the system. The status page may include a menu 62 near the top of the page permitting the user of the writer system to navigate through the steps within the writing process. In particular, the menu may include one or more hyperlinks to other pages in the writer system including the pending page, as shown in FIGS. 4A and 4B, a rating page as shown in FIGS. 6A and 6B, an information completion page as shown in FIGS. 7A and 7B, a story writing page in FIGS. 8A and 8B, a web data page as shown in FIGS. 8A and 8B, an editing page as shown in FIGS. 9A and 9B, a view report page as shown in FIGS. 5A–5C and a search page as shown in FIGS. 11A and 11B. The invention, however, is not limited to the pages described below and additional pages may be added to provide more functionality to the system, such as a page for managing multimedia components and multimedia production. The system, using these pages, may be easily expanded using existing technologies or new technologies by adding additional pages to provide the user of the system with access to the existing technologies or any new technologies. Each of the above pages will be described in more detail below.

The status page 60 may further include an unrated story section 64, a stories to be updated section 66 and a stories in process and stories completed section 68. A unique status page may be generated for each user of the system so that, for example, a writer may see a status page listing the stories currently in the system for the particular writer. Thus, the status page may also be viewed as a sort of flow-based inbasket for each individual. The status page reflects the status of each story based on the traffic flow defined by the system so that it includes stories that appear because they are currently in the story creation process, because they have just come been submitted as a story submission and need a decision on whether they should be processed, or because the story needs updating.

The unrated stories section contains story submissions within the database which have not yet been rated by a writer and approved by an editor as described above. Until a story is rated as being appropriate for publishing or not, the story submission will remain in the unrated section of the pending page of the writer and editor responsible for that customer. The stories to be updated section 66 may include stories whose submission information needs to be updated or augmented. In particular, once a story has been live to the public (published) for the predetermined period of time, the story appears in the updated section 66 because the story now needs to be checked for accuracy. The story remains in the updated section 66 until it has been checked and updated, if appropriate. Once the update has been completed for the particular story, the particular story is removed from the updated section and the predetermined time period is reset so that the story will appear again in the updated section after the predetermined time period expires again. Thus, each story will periodically be placed into the updated section to reverify the accuracy of the story.

The pending stories section 68 contains all of the stories which are currently being prepared using the system 20. The pending story section 68 may include a serial number section 70, a title section 72, a tickler section 74 and a story preparation status section 76 and other story status information as appropriate. Any story on a status page for a particular user which has been rated as worthy of writing and publication, but which has not yet been completed may be displayed in the pending story section for the appropriate writer and editor. The serial number section lists an identifier associated with each story, the name section lists the name of the story and the tickler section lists any due dates associated with the particular story. The story preparation status section 76 may include a panel 78 associated with each page listed above (the rating page, the information completion page, the story writing page, the web data page, and the editing page corresponding to the "1" panel, the "2" panel, the "3" panel, the "4" panel and the "5" panel, respectively). As all of the steps and items associated with a particular page are completed, the panel may change colors to indicate that that portion of the story generating process has been completed.

The important thing about the status page is that it is automatically updated in real time as steps of the story creation process are completed so that the status page for any user of the system is constantly updated. Each status page also provides an individually customized overview of the entire process from the perspective of the writer, editor, administrator or other authorized user (i.e., each user views his own personalized status page based on the stories for which the user has responsibility). The status page may also be implemented using pop-up menus, other forms of navigation and status display as well as the use of additional colors and additional information so that the status page is not limited to the example shown.

In a preferred embodiment, the panels for uncompleted pages may be red while the panels for completed pages may be yellow although the invention is not limited to these colors.

For example, for a story entitled "Greyhound", all of the pages of the story creation process have been completed while for the story entitled "Hewlett Packard", the steps in the information completion page, the web data page, and the editing page have not been completed. In this manner, using the status page 60, a user of the system that has the access and the authority to view this page may easily determine the current status of the stories currently being prepared using the system including which portions of the story creation process have been completed. As above, the access to the data in the status page may be restricted so that a particular corporation may only see its own stories in the pending story section 68. Now, each of the pages associated with the story creation process will be described in more detail.

FIGS. 5A–5C are diagrams illustrating an example of a page 90 showing information about a particular story being prepared using the system. The page may summarize the information gathered about a particular story in the system. The page may include a dashboard section 92 located near the left side of the page which provides information about the status of various tasks in the story creation process. The dashboard section 92 accurately reflects the current status of the individual checkboxes for the instruction steps listed at the top of each page of the writer system as described below. The dashboard section may uses logic and rules to summarize important information relating to the individual steps of the process so that each of the items listed in the dashboard section provides information to quickly inform the viewer what has been done, what is pending, and tell them where in the system ( the help system) to find the instructions for that particular step or steps. Therefore, from this page and every other story creation page described below, it is possible to easily determine the status of the particular story based on the dashboard.

In the dashboard, each checkbox 94 may have a number in parentheses associated with it which refers to the particular step in the particular page. As shown in FIG. 5A, the dashboard may include an initial OK section 96, a copy edit section 98, a WebReady section 100, a data complete section 102 and an implementation section 104. In the particular example shown, all of the boxes in the dashboard have been checked off indicating that these steps have been completed except for a spiked checkbox 106. If the spiked checkbox is checked off, then the story has been discarded by the writer or editor (depending on who has the privilege to spike a story) at some point in the story creation process which may be long before the story is written, such as anytime after the submission is made. In general, the vast majority of spikings occur before the story is written when the writer rates the story. In the example shown, the story is ready for publishing and is awaiting the final review by the editor, customer and possibly the person/organization featured in the story and the posting of a date after which the story may be published.

The story summary page 90 may also include original submission data including contact addresses and URLs to review, a description of the project about which the success story is being written, why the story is a good success story, the hardware and software used for the project, the contact address to appear on the published copy, and various story specific data, such as the headline, the story capsule, the story lead, the story body and quotes from the story. The story summary page 90 may be accessed by entering the writer system or by clicking on the view report button after selecting a particular story. Now, the submission rating page will be described in more detail.

FIGS. 6A and 6B are diagrams illustrating an example of a page 110 for managing the submission rating process in accordance with the invention. The page 110 may include the dashboard 92 which indicates the current status of the particular story. This page permits the writer of the system to assign a story name, to rate the submission using radio buttons and a notes field (not shown), to send the suggested rating to the editor for approval (the editor may either approve the story or spike the story). The rating of the story may involve the writer selecting a radio button indicating the rating of the story and a notes field which permits the writer to indicate why the particular rating was made. The stated story may be submitted to an editor who may then check the box authorizing the story or check the box spiking the story and the time that the story was spiked. At this point, the story is either authorized to be prepared or it is spiked and discarded. If the story is authorized and any initial research of the story confirms the value of the story, then the contact person is sent a release form or sent to a website to retrieve the release form to sign and return to an address. Thus, the rating page permits a writer and an editor to filter the incoming story submissions and spike unwanted story submissions. The rating page may also include lead contact information from the story submission which may be reviewed by the editor in determining the rating. Now, the process of gathering additional information will be described.

FIGS. 7A and 7B are diagrams illustrating an example of a page 120 for managing the gathering of additional information required to write the story in accordance with the invention. As above, the page 120 may include the dashboard 92 with the current status of the story. This page may ensure that the person preparing the story performs various fact finding tasks (i.e., story research) prior to preparing the story. The various facts learned during the story research may be stored in a notes field. For example, the person must contact the submitter and determine various facts including confirmation of the accuracy of the submitted information, obtain verbal consent for use of the story, obtain any additional information about the story and any quotes for the story, get the data about the person who is going to appear as the contact for the published story, and have the submitter obtain and sign a release form. The page may also require the person to document the verbal release and email the submitter thanking them for their time. As the person checks the items off in the page, the corresponding dashboard items are also checked off in all of the pages so that each page has a current status of the story. In the dashboard, individual steps of the information gathering process may be identified as completed such as the verbal release, the e-mailed thank you, a faxed copy of the signed release and an original received copy of the signed release. Now, a page for managing the writing of the story will be described.

FIGS. 8A and 8B are diagrams illustrating an example of a page 130 for managing the writing of the story in accordance with the invention. The page may include the dashboard 92 with the current status of the particular story. The page may also include a checkbox section 132 and a story writing section 134. The checkbox section 132 includes check boxes which may be checked when the faxed copy of the release has been received, when the story and its constituent parts have been written, when the story has been spellchecked, when keywords have been assigned to the story, when the original release is received, and any other follow up. The story writing section 134 may provide the story writer with a space to enter various information about the story such as the project title, the story headline, the story capsule, the story lead, the story body and quotes for the story. The story writing section may also permit the writer to choose keywords for the story as well as the markets to which the story may apply. Thus, this page permits the writer of the story to follow up on any missing items and write the story. Now, the page for managing the story publication process will be described.

FIGS. 9A and 9B are diagrams illustrating an example of a page 140 for managing the story publication preparation process in accordance with the invention. The page may include the dashboard 92 and a checkbox section 142 for completing the final steps to publish the story. The steps may include confirming that an original signed release has been received, confirming any incoming videos or images associated with the story, confirming the accuracy of the information, filling in the software and hardware information, confirming the image and video materials are ready to publish, and indicating that the story is ready for the editor to review. The other portion of the page permits the story writer to assign the hardware and software used for the project. These pages permit the story creation process to be managed by an editor and provides frequent rechecks for critical process steps. The pages also are dynamic and any updates to any of the pages are reflected in the dashboard for any of the other pages. Now, the editor page will be described which may only be accessed by a story editor.

FIGS. 10A–10D are diagrams illustrating an example of a page 150 for managing the story editing process in accordance with the invention. This page may only be accessed by an editor of a story and this page permits the editor to make a final review of the story before authorizing the publication of the story. In this manner, the editor has a final veto power over the story even after the story has been completed. As above, the page may include the dashboard 92 to review the current status of the story. The page may also include a display section 152 which displays the data to be published on a web site to permit a final copy edit review by the editor. The page may also display the contact information and the project description. The page 150 may also include a checkbox section 154 which permits the editor to make a final check of the story before it is published. For example, the editor must spellcheck the story and check for any other errors. The editor may then check a WebReady button which checks the appropriate box in the dashboard to indicate that the story is ready to be published to the web site. The editor may also set an Online Date (the date which the story is actually available for viewing) which may be now or some later time to coincide, for example, with a marketing pitch about the product. The editor may also designate the story as a featured story from a certain start date until a certain stop date as well as quotes from the story. Once the editor has indicated the WebReady status and the online date is now, the story is published on a web site and may be viewed by anyone accessing the web site. Now, an example of the page for permitting searching will be described.

FIGS. 11A and 11B are diagrams illustrating an example of a page 160 for searching for stories in the system. The search page may provide one or more different criteria which may be used for purposes of searching the database for a matching story. The search page may return the one or more stories which match the search criteria.

In summary, the system provides for workflow management during a story creation process. The system provides constant updates about the status of any story in the system and may provide different data to different people based on the security level of the person. The system may increase the speed with which a story may be generated since each sub-system of the system may operate independently and permit users to access relevant pages at any time. Thus, the user of the system, such as the story submitters, the story writers and the story editors, may all work independently of each other and at different times and geographic locations so that the speed of the story creation is not limited by the availability of any person. While the foregoing has been with reference to a particular embodiment of the invention, it will be appreciated by those skilled in the art that changes in this embodiment may be made without departing from the principles and spirit of the invention, the scope of which is defined by the appended claims.

What is claimed is:

1. A story workflow management system, comprising:

a first computer comprising means for storing a plurality of data records, each data record containing information about a particular story including a story submission and a rating of the story, and means for managing the story workflow process from lead generation to publishing the story, the first computer further comprising one or more software modules for managing the one or more steps of the story generation process and wherein the one or more modules comprises a submission module comprising means for receiving a submission for a user, the submission including contact information about the submitter and information about the potential story and a story generation module comprising means for generating a story based on the story submission comprising means for rating a story submission as being publishable and means for managing a story submission rated as publishable in order to produce a publishable story, the managing means comprising means for tracking the one or more steps involved in publishing the story wherein each step is independent of each other step and the steps are completed in any order;

a submission client connected to the first computer by a communications network, the submission client comprising means for receiving data from the first computer about the story submission process, means for accepting a story submission and means for communicating the story submission to the first computer so that the story submission is stored in the first computer; and an editor client connected to the first computer by a communications network, the editor client comprising means for rating each story submission and means for generating a published story in response to the rating of the story submission.

2. The system of claim 1, wherein the first computer, the submission client and the editor client are located at different geographic locations and operate independently of each other so that the story workflow process may be completed at any time by a person at various different geographic locations.

3. The system of claim 1, wherein the managing means of the first computer further comprises means for tracking the completion of one or more story generation steps wherein the story generation steps are independent of each other and are completed in any order.

4. The system of claim 1, wherein the first computer further comprises means for generating one or more web pages provided to the submission client and the editor client in order to extract story generation information from the submitter and from the editor to generate the published story.

5. The system of 4 further comprising means for generating the one or more web pages based on the security access level of the user.

6. The system of claim 1, wherein the means for managing further comprises means for graphically tracking the completion of each step in the story generation process so that a user can determine the status of any step of a story.

7. The system of claim 1, wherein the one or more modules comprises an administration module comprising means for administrating the usage of the system comprising means for providing a predetermined level of access to the system for a predetermined user so that different people view different information.

8. The system of claim 7, wherein the one or more modules further comprise a publishing module, a story lead module and a multimedia module wherein the publishing module comprises means for publishing the publishable story in one or more different formats, wherein the story lead module further comprises means for generating a plurality of story leads that may result in a story submission, and wherein multimedia module further comprises means for storing a plurality of multimedia objects associated with the stories so that one or more multimedia objects are associated with a particular story.

* * * * *